United States Patent [19]
Muckridge

[11] Patent Number: 5,655,722
[45] Date of Patent: Aug. 12, 1997

[54] PRECISION BALANCED FISHING REEL

[76] Inventor: David A. Muckridge, 10616 S. 42nd St., Phoenix, Ariz. 85044

[21] Appl. No.: 568,590

[22] Filed: Dec. 5, 1995

[51] Int. Cl.$^6$ .................................................. A01K 89/033
[52] U.S. Cl. ........................ 242/295; 242/283; 242/302; 242/396.5
[58] Field of Search ..................................... 242/283, 284, 242/295, 302, 310, 156.2, 396.5

[56] References Cited

U.S. PATENT DOCUMENTS

| | | | |
|---|---|---|---|
| 691,073 | 1/1902 | Rabbeth | 242/295 |
| 2,096,299 | 10/1937 | Grieten | 242/295 |
| 2,261,629 | 11/1941 | Murphy | 242/283 |
| 2,306,257 | 12/1942 | Adams | 242/295 |
| 2,306,259 | 12/1942 | Khoenle | 242/295 |
| 2,331,249 | 10/1943 | Treadway | 242/295 |
| 2,597,486 | 5/1952 | Hockney | 242/283 |
| 3,697,012 | 10/1972 | Walker | 242/295 |

Primary Examiner—Katherine Matecki
Attorney, Agent, or Firm—Meschkow & Gresham, P.L.C.

[57] ABSTRACT

A precision balanced fishing reel incorporates a fork-mounted spool coupled to an axle that rotates upon precision bearing assemblies. The fishing reel is rotationally balanced and fabricated from lightweight and heat-tolerant materials to facilitate high speed operation with little or no vibration and wobble. The fishing reel includes a disc braking system that utilizes a rotor coupled to the spool through a clutch bearing. The clutch bearing is configured to prevent independent rotation of the spool, relative to the rotor, in an outgoing direction while permitting unrestricted rotation of the spool in an incoming direction. A brake assembly employs brake pads to control the amount of rotational drag of the rotor and spool.

11 Claims, 3 Drawing Sheets

PRECISION BALANCED FISHING REEL

BACKGROUND OF THE INVENTION

1. Field of the Invention

The present invention relates generally to fishing equipment. More specifically, the present invention relates to fishing reels.

2. The Prior Art

A vast number of fishing reels designed for many different applications are known in the art. A fishing reel is typically designed to perform the basic functions of releasing and collecting fishing line in response to user interaction with the reel. Although conventional fishing reels may be acceptable for some applications, they may be inadequate for other applications. Thus, many existing fishing reels are unfavored among experienced or professional anglers.

Conventional fishing reels may not be designed to tolerate the high rotational speeds that are encountered from time to time. For example, the rotating elements of many existing fishing reels may be poorly adapted to rotate at very high speeds. In addition, unless a reel is carefully balanced, high rotational speed causes undesirable vibrations, shaking, and wobbling in the fishing rod and reel assemblies. An unbalanced reel operating at high speed may cause the user to prematurely fatigue or may cause damage to the fishing rod and/or the reel itself.

Known fishing reels may be fabricated from materials unsuited for high speed operation. For example, some conventional reels can suffer from thermal expansion during extended or high speed use. Such thermal expansion may result in an unwanted increase in outgoing and incoming line drag. Heavy materials may adversely affect the responsiveness that may be desirable in a high speed reel. In addition, heavy construction materials may limit the practical size and corresponding line capacity of a fishing reel.

In certain situations, an angler may desire to control the outgoing line drag or outgoing line speed. For example, an amount of line drag may be useful to prevent slack from accumulating in the fishing line as it is released from the reel. Excess line may become tangled within the reel or become dangerously strewn about the angler's feet. If a fish is caught, it may be desirable to vary the outgoing line drag as the line is reeled in. For ease of use and enhanced line control, incoming line drag should be kept to a minimum. Unfortunately, conventional fishing reels may not incorporate unidirectional line drag adjusters.

It may be advantageous to vary the outgoing line drag while in the process of landing a fish. Unfortunately, fishing reels with variable line tensioning features may not be capable of easy adjustment during use. Such reels may require awkward manipulation of the fishing rod or manual adjustments at screws or levers located close to the reel itself. As such, manual adjustment of high speed reels can be unsafe if performed while the reels are in use.

SUMMARY OF THE INVENTION

Accordingly, it is an advantage of the present invention that a precision balanced fishing reel is provided that is suitable for high speed applications.

Another advantage of the present invention is that it provides a rotationally balanced fishing reel that experiences little vibration or wobble during high speed use.

A further advantage is that the fishing reel incorporates a fork-mounted spool and precision bearing assemblies.

An additional advantage of the present invention is that a fishing reel constructed of lightweight and heat-tolerant materials is provided.

Another advantage is that the present invention provides a fishing reel having an adjustable outgoing line drag feature that permits substantially unrestricted incoming line collection.

A further advantage of the fishing reel is that an angler can safely adjust the outgoing line drag while the reel is rotating at high speed.

Several of the above and other advantages of the present invention are carried out in one form by a precision high speed fishing reel. The reel includes a fork having first and second legs. A bearing assembly is located at each leg and an axle extends between the first and second legs and rotatably cooperates with the bearing assemblies. A spool is coupled to the axle, which rotates about its longitudinal axis.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENT

Figures 1, 2:
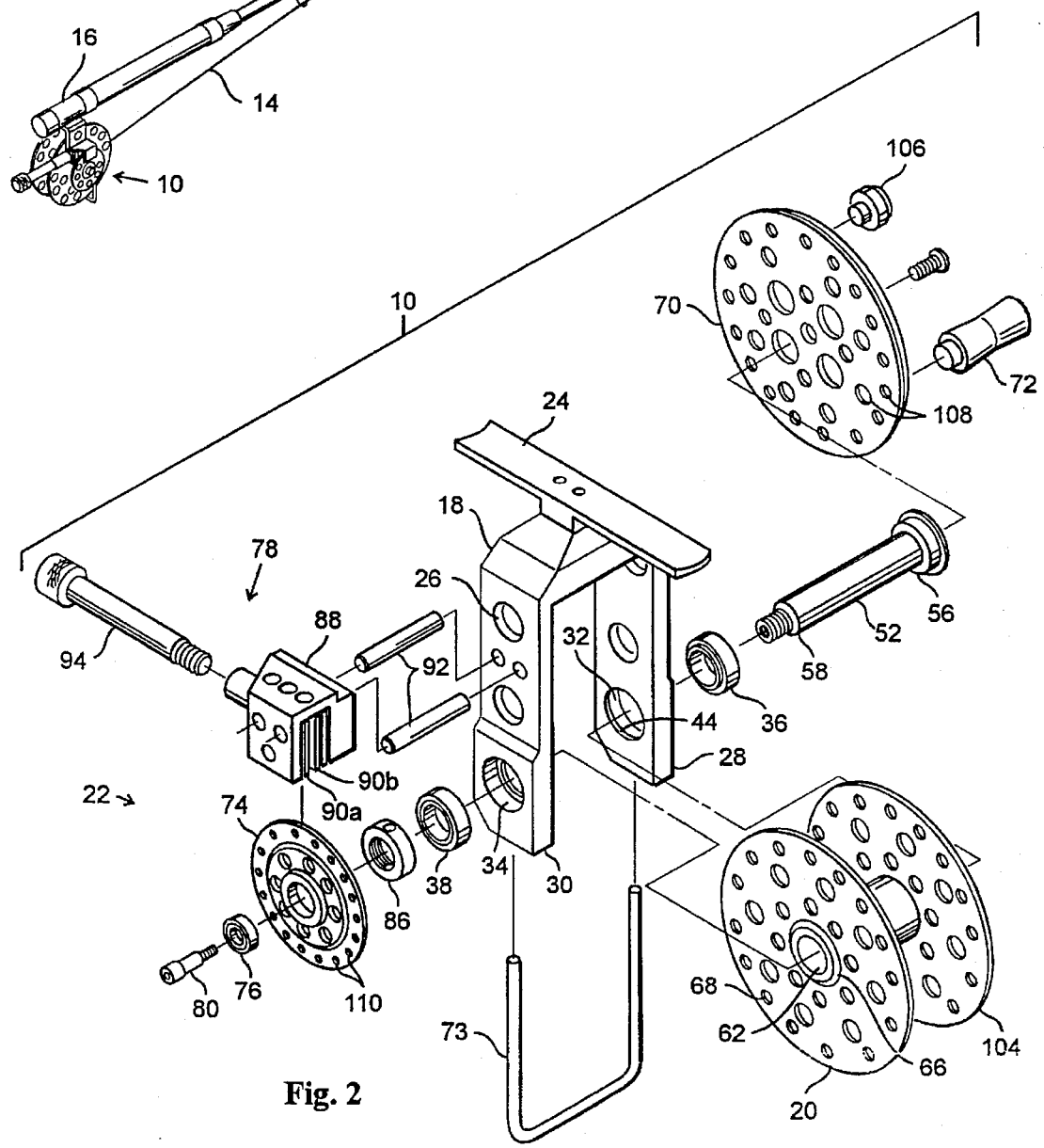
FIG. 1 is a perspective view of a precision balanced fishing reel installed upon a fishing rod.
FIG. 2 is an exploded perspective view of the fishing reel.

Referring to FIG. 1, a precision balanced fishing reel 10 in accordance with the preferred embodiment of the present invention is illustrated as installed upon an exemplary fishing rod 12. Reel 10 stores, releases, and collects a quantity of fishing line 14 as necessary during use. Reel 10 is typically installed proximate a handle end 16 of fishing rod 12. During use, a user (not shown) grasps handle end 16 and manipulates reel 10 when desired to release, collect, or cast fishing line 14.

FIGS. 2–5 illustrate various views of reel 10. Reel 10 generally includes a fork 18, a spool 20, and a braking system 22. Spool 20 rotates within fork 18 in an incoming direction when fishing line 14 is being collected and in an outgoing direction when fishing line 14 is being released. For purposes of this description, the incoming direction corresponds to clockwise rotation of spool 20 in FIG. 3 and the outgoing direction corresponds to counterclockwise rotation of spool 20 in FIG. 3.

Braking system 22 may be employed to regulate the rotational drag of spool 20 in the outgoing direction while permitting substantially unrestricted rotation in the incoming direction. The rotational drag may be adjustably set to reduce the amount of slack in fishing line 14 or to control the outgoing speed of fishing line 14. On the other hand, low resistance in the incoming direction is desirable to enable the user to easily collect fishing line 14.

Fork 18 may include a mounting bracket 24 for coupling reel 10 to fishing rod 12. Fork 18 is preferably formed from a lightweight, rigid, and relatively heat-tolerant material such as aluminum or titanium. If necessary for balancing or weight reduction, fork 18 may include one or more lightening holes 26 formed therein.

Fork 18 has a first leg 28 and a second leg 30 extending away from mounting bracket 24. First and second legs 28 and 30 have first and second bores 32 and 34, respectively, formed therein. First bore 32 is sized to receive a first bearing assembly 36 and second bore 34 is sized to receive a second bearing assembly 38.

Bearing assemblies 36 and 38 are preferably self-contained precision bearings known to those skilled in the art. Bearing assemblies 36 and 38 are capable of stable high speed rotation. Bearing assemblies 36 and 38 are substantially similar, therefore the following description of first bearing assembly 36 also applies to second bearing assembly 38.

Figure 5:
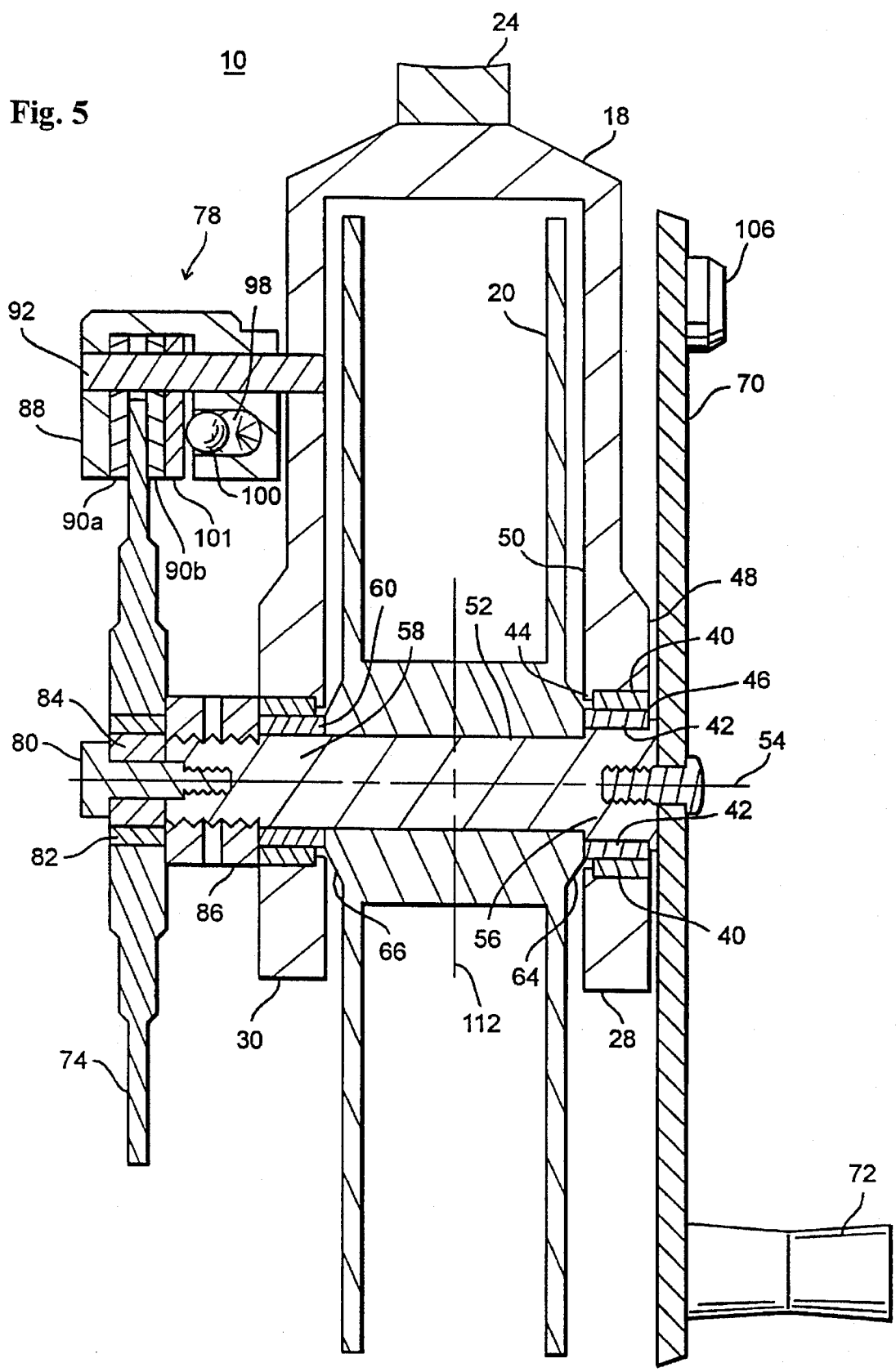
FIG. 5 is a front cross sectional view of the fishing reel as viewed from line 5—5 in FIG. 3.

First bearing assembly 36 includes an outer sleeve 40 and an inner sleeve 42 configured to rotate relative to outer sleeve 40 (see FIG. 5). Outer sleeve 40 is preferably received within first bore 32 such that it nonrotatably couples to first leg 28. For example, first bearing assembly 36 may be sized to fit snugly into first bore 32 or outer sleeve 40 may be affixed to first leg 28. Outer sleeve 40 abuts a retaining shoulder 44 formed within first leg 28 such that an exterior surface 46 of first bearing assembly 36 is approximately flush with an exterior surface 48 of first leg 28. Inner sleeve 42 preferably extends beyond retaining shoulder 44 and terminates approximately flush with an interior surface 50 of first leg 28.

An axle 52 extends between first and second legs 28 and 30 such that it rotates about a longitudinal axis 54 on first and second bearing assemblies 36 and 38. As shown in FIG. 5, inner sleeve 42 of first bearing assembly 36 receives a first axle end 56. A second axle end 58 is similarly received within an inner sleeve 60 of second bearing assembly 38. Inner sleeves 42 and 60 may be nonrotatably coupled to first and second axle ends 56 and 58, respectively. For example, axle ends 56 and 58 may be sized to snugly fit within inner sleeves 42 and 60.

Spool 20 is coupled to axle 52 between first and second legs 28 and 30. Spool 20 and axle 52 are approximately coaxial, i.e., spool 20 also rotates about longitudinal axis 54. Spool 20 includes a centerhole 62 (see FIG. 2) formed therein for receiving axle 52. Spool 20 can be press fit onto axle 52 or nonrotatably mounted to axle 52 via internal grooves or keyways (not shown) that cooperate with axle 52.

In the preferred embodiment, spool 20 includes first and second raised bosses 64 and 66 formed around centerhole 62. First raised boss 64 engages inner sleeve 42 of first bearing assembly 36 and second raised boss 66 similarly engages inner sleeve 60 of second bearing assembly 38. This preferred configuration eliminates the need for bushings or washers between spool 20 and bearing assemblies 36 or 38. In addition, dirt and grime are less likely to collect and adversely affect the rotation of spool 20.

Spool 20 is desirably fabricated from a lightweight and heat-tolerant material such as aluminum or titanium. In addition, spool 20 is rotationally balanced (at least to within a desirable tolerance) to facilitate operation at high rotational speeds without an excess amount of vibration or wobbling of reel 10. Spool 20 can include any number of lightening holes 68 formed therein for weight reduction and/or rotational balancing.

Reel 10 preferably has a flywheel 70 nonrotatably coupled to spool 20 via axle 52. In the embodiment shown, flywheel 70 is attached to first axle end 56 such that it is situated outside of fork 18. Attached to flywheel 70 is a handle 72, which is configured to enable manual rotation of spool 20. Flywheel 70 is preferably disc-shaped and sufficiently sized to form a guard for the side of spool 20. Thus, flywheel 70 prevents the user from accidentally contacting spool 20 while he or she manipulates handle 72.

Reel 10 also includes a line guard 73 (see FIG. 2) coupled to fork 18. Line guard 73 guides fishing line 14 around spool 20 while the user operates reel 10. Line guard 73 also serves to prevent fishing line 14 from becoming tangled within reel 10.

As described briefly above, braking system 22 enables the user to adjustably regulate rotational drag of spool 20 in the outgoing direction while permitting substantially unrestricted rotation in the incoming direction. Braking system 22 preferably includes a rotor 74, a clutch bearing 76, and a brake assembly 78 mounted to fork 18 and configured to cooperate with rotor 74.

Rotor 74 is substantially disc-shaped and rotationally balanced to within a desirable tolerance. Rotor 74 is preferably formed from a heat-tolerant material such as aluminum. Rotor 74 preferably maintains its shape under normal operating temperatures, which may be relatively high due to the frictional interaction between rotor 74 and brake assembly 78. Rotor 74 is coupled to axle 52 through clutch bearing 76 and a spindle 80.

In the preferred embodiment, clutch bearing 76 includes an outer sleeve 82 that resides within and nonrotatably couples to rotor 74. An inner sleeve 84 of clutch bearing 76 receives and nonrotatably couples to spindle 80. Reel 10 may incorporate a bushing 86 that secures axle 52 to fork 18 and maintains rotor 74 at a desired distance from second leg 30.

Clutch bearing 76 is configured to substantially prevent rotation of spool 20 in the outgoing direction relative to rotor 74 while permitting substantially unrestricted rotation of spool 20 in the incoming direction relative to rotor 74. In other words, inner sleeve 84 of clutch bearing 76 can only rotate in one direction relative to outer sleeve 82 of clutch bearing. Clutch bearings are commercially available and well known to those skilled in the art. As such, they will not be described in detail herein.

As a result of the directional nature of clutch bearing 76, spool 20 and rotor 74 rotate together in the outgoing direction (under normal operating conditions). Consequently, brake assembly 78 may be utilized to control outgoing line drag or outgoing line speed through rotor 74. On the other hand, spool 20 can rotate in the incoming direction independently of rotor 74.

Figure 6:
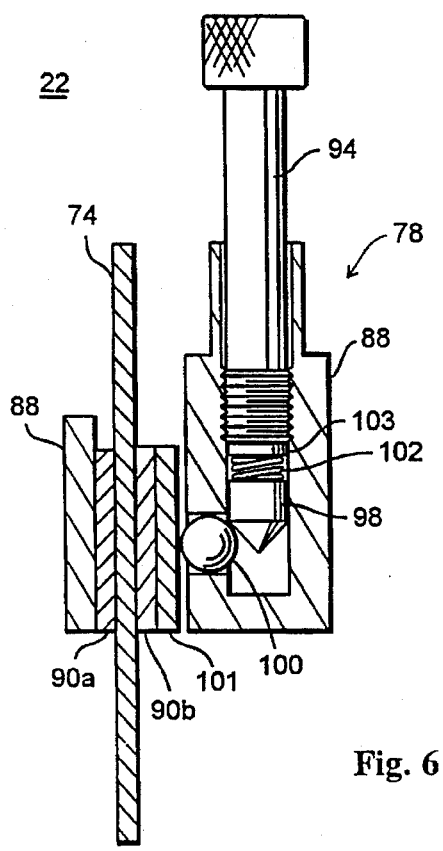
FIG. 6 is a top cross sectional view of a brake assembly as viewed from line 6—6 in FIG. 3.

A caliper housing 88 provides a structural foundation for brake assembly 78. FIG. 6 illustrates a cross sectional view of caliper housing 88 as viewed from line 6—6 in FIG. 3. Caliper housing 88 is preferably mounted to second leg 30 of fork 18. Residing within caliper housing 88 is a cooperating pair of brake pads 90a and 90b. Brake pads 90 are preferably formed from a heat tolerant and durable material that will not severely damage or distort rotor 74 during normal use.

According to one aspect of the preferred embodiment, caliper housing 88 and each of brake pads 90 are carried on a plurality of mounting pins 92 (see FIG. 2) that are coupled to second leg 30. Rotor 74, which rotates between brake pads 90, maintains caliper housing 88 and brake pads 90 upon mounting pins 92. Consequently, caliper housing 88 and brake pads 90 are free to "float" upon mounting pins 92 until limited by rotor 74.

Caliper housing 88 threadably receives an adjustment screw 94, which is adapted to vary the force imparted by brake pads 90 upon rotor 74. Adjustment screw 94 engages a brake pad actuator 96 located within caliper housing 88. As shown in FIG. 6, brake pad actuator 96 includes a conical piston 98 that cooperates with a ball bearing 100. Axial movement of piston 98 causes ball bearing 100 to move in a direction perpendicular to the longitudinal axis of piston 98. In turn, ball bearing 100 contacts brake pad 90b. To eliminate direct contact between ball bearing 100 and brake pad 90b, a rigid plate 101 may be located between brake pad 90b and caliper housing 88. Thus, brake pad actuator 96 urges brake pad 90b toward rotor 74 in response to rotation of adjustment screw 94.

Brake assembly 22 also includes a bias spring 102 located between piston 98 and adjustment screw 94. A cap 103 prevents adjustment screw 94 from directly contacting bias spring 102. Cap 103 allows bias spring 102 to compress without binding or twisting. Bias spring 102 enables the user to smoothly adjust the braking effect caused by brake pads 90. During adjustment, bias spring 102 compresses to "absorb" a portion of the axial displacement of adjustment screw 94. As such, as bias spring 102 compresses, it enables adjustment screw 94 to equivalently function as if it has a variable pitch.

The floating feature of caliper housing 88 enables brake pads 90 to apply substantially even pressure against rotor 74. It should be appreciated that the user may control the amount of pressure between brake pads 90 and rotor 74 via adjustment screw 94. Thus, rotational drag and/or the rotational speed of spool 20 in the outgoing direction is continuously variable.

Figure 3:
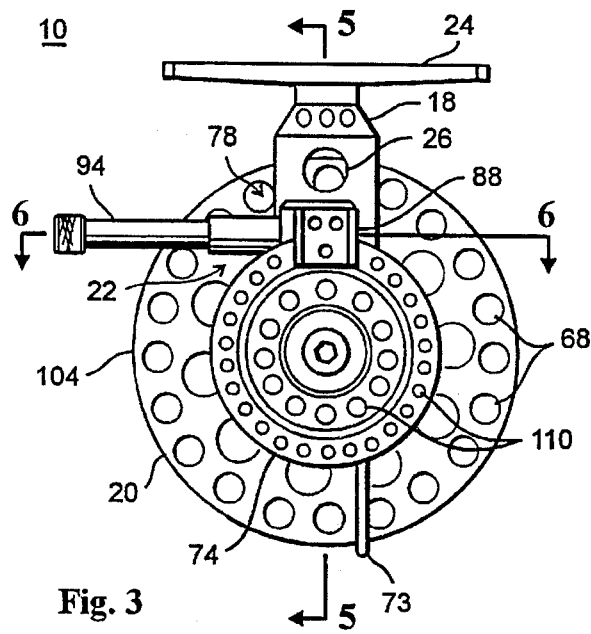
FIG. 3 is a right side view of the fishing reel.
Figure 4:
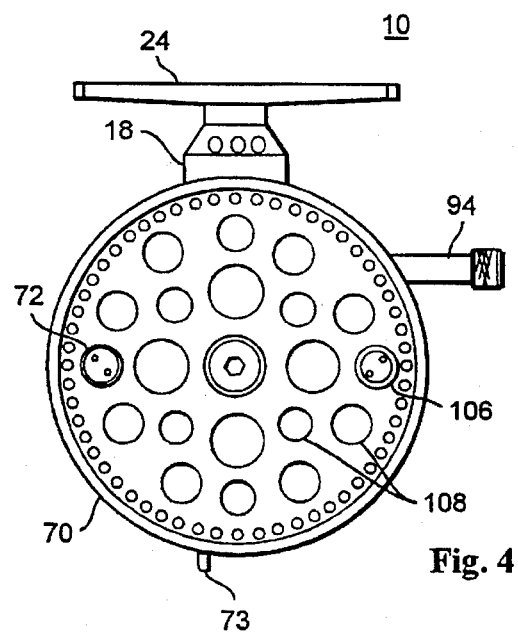
FIG. 4 is a left side view of the fishing reel.

As shown in FIG. 3, adjustment screw 94 protrudes beyond an outer perimeter 104 of spool 20. This preferred position of adjustment screw 94 enables a user to quickly and easily adjust the outgoing line drag while using fishing rod 12 (see FIG. 1). In addition, the location of adjustment screw 94 keeps the user's hand safely away from spool 20, flywheel 70, and rotor 74, each of which may be rotating at very high speeds.

As described above, various components of reel 10 are rotationally balanced to within a desired tolerance. This enables reel 10 to operate smoothly at high speeds with little or no detectable vibration, wobbling, or shaking. For example, flywheel 70 preferably includes a counterweight 106 to compensate for handle 72 and/or any other rotational imbalances within reel 10. Flywheel 70 can include any number of lightening holes 108 that may serve to further balance flywheel 70 (in addition to reducing the weight of flywheel 70 and enhancing the appearance of reel 10).

Reel 10 may also incorporate counterweights (not shown) in other rotating components, such as rotor 74, spool 20, or axle 52. In addition, spool lightening holes 68 and a number of rotor lightening holes 110 may also serve to further balance reel 10.

In addition to being substantially balanced in a rotational sense, reel 10 is preferably balanced in a static sense. As depicted in FIG. 5, spool 20 has a geometrical center 112 along longitudinal axis 54. Reel 10 is substantially balanced (within a desirable tolerance) about center 112. In other words, reel 10 has a center of mass located substantially on a plane that perpendicularly intersects center 112. Thus, the user will experience little or no imbalance about center 112 when fishing rod 12 is held with longitudinal axis 54 substantially horizontal.

In summary, the present invention provides a precision balanced fishing reel suitable for high speed applications. The fishing reel is rotationally balanced to reduce vibration and wobble during use. To enhance its high speed capabilities, the fishing reel incorporates a fork-mounted spool and precision bearing assemblies and is constructed of lightweight and heat-tolerant materials. The fishing reel is configured such that the outgoing line drag is adjustable via a disc brake system. The disc brake system includes an adjustment screw that is located such that an angler can safely adjust the outgoing line drag while the reel is rotating at high speed.

The above description is of a preferred embodiment of the present invention, and the invention is not limited to the specific embodiment described and illustrated. For example, the present invention may be adapted to control the incoming line drag rather than the outgoing line drag. Furthermore, many variations and modifications will be evident to those skilled in this art, and such variations and modifications are intended to be included within the spirit and scope of the invention, as expressed in the following claims.

What is claimed is:

1. A precision fishing reel comprising:

a spool mounted within a fork and configured to rotate about its longitudinal axis; and means for adjustably regulating rotational drag of said spool in a first direction while permitting substantially unrestricted rotation in a second direction opposing said first direction, said means for adjustably regulating comprising:

a rotor;

a brake assembly mounted to said fork and configured to cooperate with said rotor, said brake assembly comprising:
a caliper housing mounted to said fork;
a cooperating pair of brake pads residing within said caliper housing; and
an adjustment screw adapted to vary force imparted by said brake pads upon said rotor; and a clutch bearing configured to substantially prevent rotation of said spool in said first direction relative to said rotor while permitting substantially unrestricted rotation of said spool in said second direction relative to said rotor.

2. A fishing reel according to claim 1, wherein:

said fork comprises a first leg and a second leg;

said fishing reel further comprises an axle extending between said first and second fork legs and configured to rotate about its longitudinal axis; and said spool is coupled to said axle.

3. A fishing reel according to claim 2, wherein:

a first bearing assembly is located at said first leg;

a second bearing assembly is located at said second leg;

said axle has a first end that rotatably cooperates with said first bearing assembly; and said axle has a second end that rotatably cooperates with said second bearing assembly.

4. A fishing reel according to claim 1, wherein said caliper housing and each of said brake pads are carried on at least one mounting pin coupled to said fork; and said caliper housing and each of said brake pads are maintained upon said at least one pin by said rotor.

5. A fishing reel according to claim 1, wherein said brake assembly further comprises a brake pad actuator configured to urge at least one of said brake pads toward said rotor in response to rotation of said adjustment screw.

6. A precision balanced fishing reel comprising:

a fork having first and second legs; and a spool located between said first and second legs and configured to rotate about its longitudinal axis, said spool being substantially rotationally balanced, wherein:

said spool has a center along said longitudinal axis; and said fishing reel has a center of mass located substantially on a plane that perpendicularly intersects said center of said spool.

7. A fishing reel according to claim 6, further comprising:

a flywheel nonrotatably coupled to said spool;

a handle attached to said flywheel, said handle being configured to enable manual rotation of said spool; and means for balancing said flywheel such that said fishing reel is substantially rotationally balanced.

8. A fishing reel according to claim 7, wherein said means for balancing comprises a counterweight mounted to said flywheel.

9. A fishing reel according to claim 7, wherein said means for balancing comprises a lightening hole formed within at least one of said spool and said flywheel.

10. A fishing reel according to claim 6, further comprising means for adjustably regulating rotational drag of said spool in a first direction while permitting substantially unrestricted rotation in a second direction opposing said first direction.

11. A fishing reel according to claim 10, wherein said means for regulating comprises:

a substantially rotationally balanced rotor;

a brake assembly mounted to said fork and configured to cooperate with said rotor; and a clutch bearing coupled to said rotor and configured to substantially prevent rotation of said spool in said first direction relative to said rotor while permitting substantially unrestricted rotation of said spool in said second direction relative to said rotor.

* * * * *